Sept. 9, 1952  L. D. STRIPLING  2,609,902
FRICTION CLUTCH
Filed Dec. 15, 1948
2 SHEETS—SHEET 1

Leslie D. Stripling
INVENTOR.

Sept. 9, 1952   L. D. STRIPLING   2,609,902
FRICTION CLUTCH
Filed Dec. 15, 1948   2 SHEETS—SHEET 2

Leslie D. Stripling
INVENTOR.

BY *Clarence A. O'Brien*
*and Harvey B. Jacobson*
Attorneys

Patented Sept. 9, 1952

2,609,902

UNITED STATES PATENT OFFICE 2,609,902

FRICTION CLUTCH

Leslie D. Stripling, Bay City, Tex.

Application December 15, 1948, Serial No. 65,367

3 Claims. (Cl. 192—35)

The present invention relates to new and useful improvements in friction clutches and more particularly to means for eliminating slipping of the clutch due to variations in the load subjected thereto.

An important object of the invention is to provide a clutch and including dual clutching elements, one of said clutch elements being manually controlled and the other of such clutch elements being controlled automatically by the manually operated clutch element.

A still further object is to provide a friction clutch mechanism of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
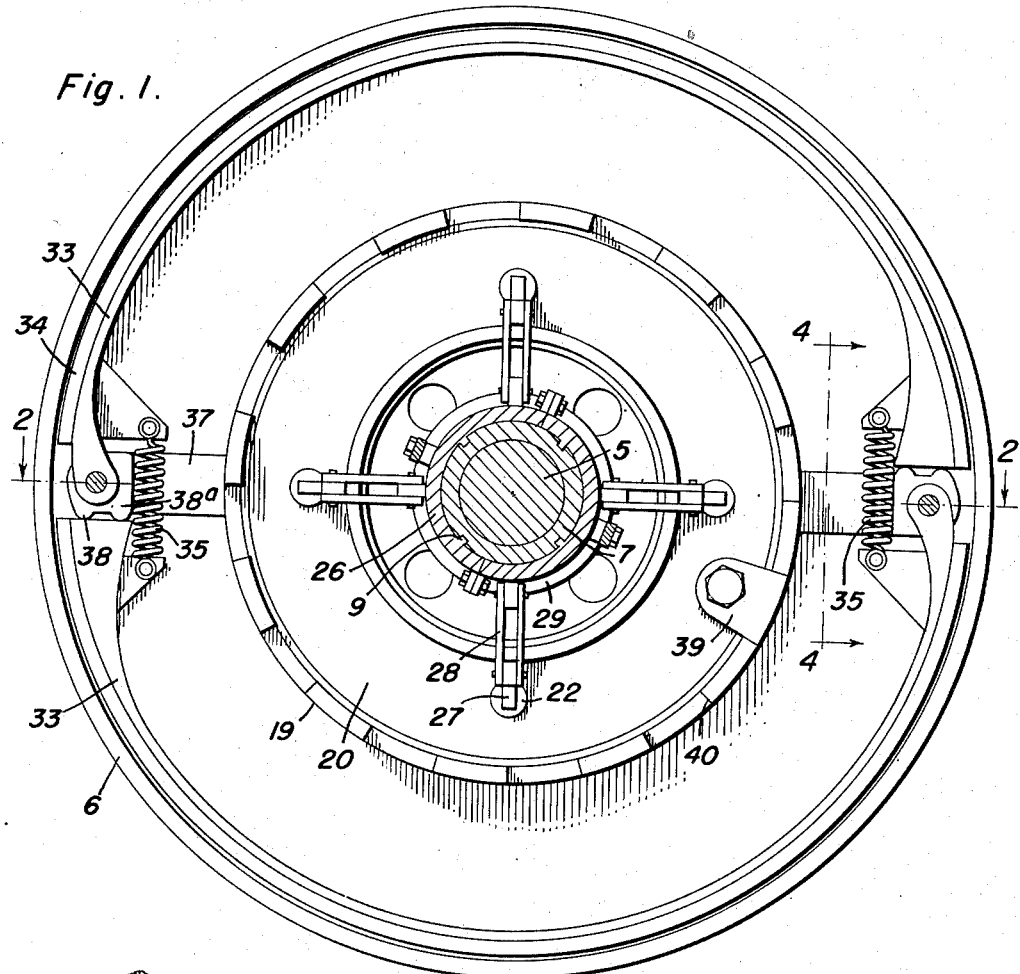
Figure 1 is an internal view of the master clutch drum with parts shown in section.
Figure 4:
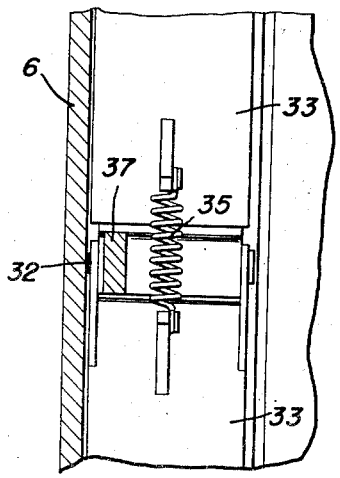
Figure 4 is a fragmentary sectional view taken on a line 4—4 of Figure 1.

Referring now to the drawings in detail wherein for the purpose of illustration I have disclosed a preferred embodiment of the invention the numeral 5 designates a shaft on which a master clutch drum 6 is journalled, the shaft 5 and drum 6 constituting the drive or driven elements as the case may be.

A sleeve 7 is secured to the inside of the drum 6 by screws or the like 8 and is freely mounted on the shaft the sleeve being formed with spline grooves 9 by means of which the hub 10 of a clutch plate 11 is secured, the clutch plate having friction clutch rings 12 and 13 suitably secured to its opposite surfaces. The hub 10 is slidable on the sleeve 7 between keeper rings 14 and 15 secured to the sleeve.

A clutch disk is shown at 16 which includes a hub portion 17 freely mounted on sleeve 7 and to which a gear 18 is suitably secured. The outer edge of clutch disk 16 is formed with an annular flange 19 projecting from a side thereof opposite to hub 17 and to the inner periphery of which an annular clutch adjusting plate 20 is threadedly secured.

An annular clutch pressure plate or ring 21 is positioned inwardly of ring 20 and is provided at one surface with a plurality of stems 22 slidably mounted in openings 23 in the plate 20. The opposite surface of pressure plate 21 is positioned for engaging the friction clutch ring 13 and the plate 21 is held released therefrom by coil springs 24 mounted on the stems 22 and bearing against washers 25 secured to the stems.

A clutch actuating collar 26 is slidably mounted on sleeve 7 and to which pivoted cams 27 are connected by links 28, the cams 27 engaging the outer ends of stems 22 for sliding the same inwardly in a direction to engage pressure plate 21 with the friction clutch plate 13.

A clutch yoke 29 is carried by collar 26 and is actuated by control rods 30 sliding in a bell mounting plate 31 keyed to shaft 5.

A plurality of pins 32 are carried by the mounting plate 31 adjacent the outer edge thereof and on which are pivotally mounted one end of clutch shoes 33 having friction clutch linings 34 engaging the drum 6.

The other end of each of the clutch shoes 33 is free and the free end of one clutch shoe is connected to the pivoted end of the other clutch shoe by means of a coil spring 35.

A pair of gear segments 36 are positioned in engagement with gear 18 at the diametrically opposite sides thereof, the gear segments including an arm 37 pivoted on the pins 32 and formed at its pivoted end with a lateral bar 37a of substantially square shape in cross section and provided on one face with a pair of parallel cam ribs 38 and 38a positioned at opposite sides of the bar and engaging the free end of an adjacent clutch shoe 33.

The clutch adjusting plate 20 is locked in its adjusted position by a lug 39 projecting radially from the plate 20 and selectively engaged in notches 40 in the edge of flange 19.

In the operation of the device, either the shaft 5 or drum 6 may constitute the drive and driven elements, the drum 6 being secured to sleeve 7 free of the shaft and clutch plate 11 being carried by sleeve 7 to rotate with the drum. Clutch plate 16, and gear 18 rotate on sleeve 7 and are connected to the shaft by plate 31, pins 32, arms 37 and gear segments 36 which engage the gear 18. Pins 32 also carry the clutch shoes 33.

Figure 2:
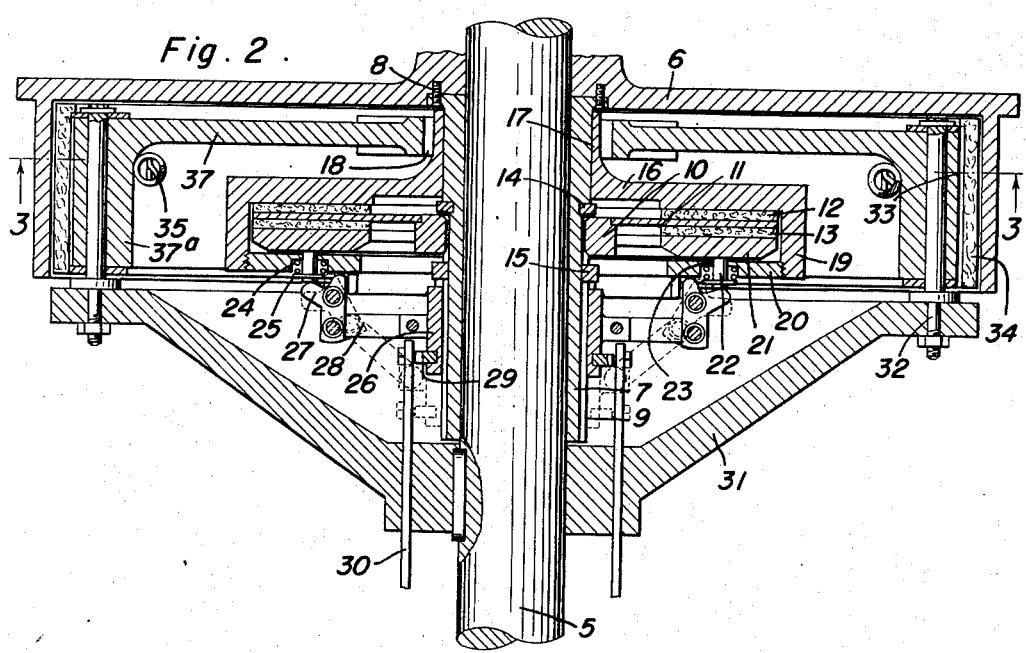
Figure 2 is a sectional view taken substantially on a line 2—2 of Figure 1.

Figure 2 shows the actuating clutch bands 12 and 13 in engaged position.

To release the clutch, collar 26 is moved outwardly as shown by dotted lines in Figure 2, by rods 30, causing levers or cams 27 to release pressure studs 22 and pressure plate 21 is moved outwardly by springs 23 to release plate 21 with clutch bands 13 and to release clutch bands 12 from plate 16. The shaft 5 and drum 6 will then rotate independently.

During clutch engaging movement of clutch bands 12 and 13 with clutch plate 16 relative rotary movement will occur between gear 18 and gear segments 36 causing the arms 38 to rock on pins 32 and exerting pressure on the free end of the clutch shoe by cams 38 or 38a to apply clutch shoes 33 to tightly engage the master clutch bands 34 with drum 6. Should slipping occur at the master clutch the relative movement between gear 18 and gear segments 36 will serve to tighten the clutch shoes 33.

Figure 3:
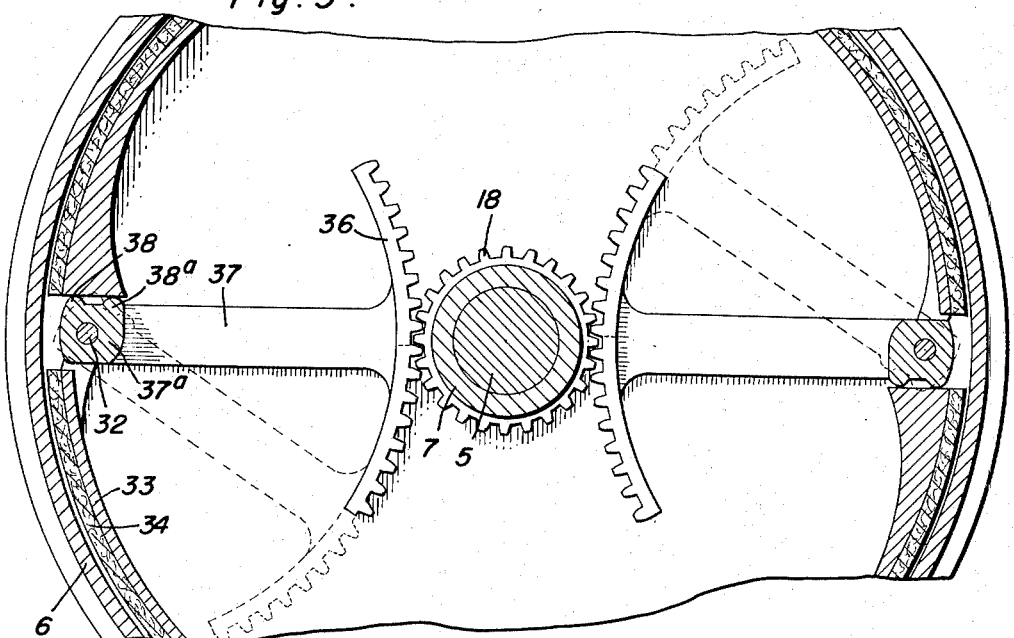
Figure 3 is a sectional view taken on a line 3—3 of Figure 2.

As indicated by dotted lines in Figure 3 movement of gear segment 36 in one direction will apply the clutch shoe through the action of cam 38 while an opposite movement of the gear segment will cause cam 38a to similarly apply the clutch shoe to provide for relative movement of the drive and driven elements in either direction.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. In combination with a drum freely rotatable on a shaft, a clutch comprising, a sleeve fixed to said drum and rotatable on said shaft, a clutch disk on said sleeve having an annular flange, a hub on said disk having a gear thereon, said disk and sleeve being relatively rotatable, an annular clutch plate in said flange splined on said sleeve for rotation therewith and sliding thereon into frictional engagement with said clutch disk, an annular member fixed in said flange, a presser ring in said flange movable therein for sliding said clutch plate into engagement with said disk and being confined in said flange by said member, means operable for moving said ring, mounting means fixed to said shaft to rotate therewith, shoe means within said drum, and arm means pivotally mounted on said mounting means and including a gear segment to mesh with said gear, said arm means being adapted upon relative rotation of said gear and said segment to bear against and expand said shoe means to grip said drum.

2. In combination with a drum freely rotatable on a shaft, a clutch comprising, a sleeve fixed to said drum and rotatable on said shaft, a clutch disk on said sleeve having an annular flange, a hub on said disk having a gear thereon, said disk and sleeve being relatively rotatable, an annular clutch plate in said flange splined on said sleeve for rotation therewith and sliding thereon into frictional engagement with said clutch disk, an annular member fixed in said flange, a presser ring in said flange movable therein for sliding said clutch plate into engagement with said disk and being confined in said flange by said member, means operable for moving said ring, mounting means fixed to said shaft to rotate therewith, shoe means within said drum, and arm means pivotally mounted on said mounting means and including a gear segment to mesh with said gear, said arm means being adapted upon relative rotation of said gear and said segment to bear against and expand said shoe means to grip said drum, said ring moving means including sliding pins in said ring carrying the ring.

3. In combination with a drum freely rotatable on a shaft, a clutch comprising, a sleeve fixed to said drum and rotatable on said shaft, a clutch disk on said sleeve having an annular flange, a hub on said disk having a gear thereon, said disk and sleeve being relatively rotatable, an annular clutch plate in said flange splined on said sleeve for rotation therewith and sliding thereon into frictional engagement with said clutch disk, an annular member fixed in said flange, a presser ring in said flange movable therein for sliding said clutch plate into engagement with said disk and being confined in said flange by said member, means operable for moving said ring, mounting means fixed to said shaft to rotate therewith, shoe means within said drum, and arm means pivotally mounted on said mounting means and including a gear segment to mesh with said gear, said arm means being adapted upon relative rotation of said gear and said segment to bear against and expand said shoe means to grip said drum, said ring moving means including sliding pins in said ring carrying the ring, and pivoted cams on the ring for sliding said pins.

LESLIE D. STRIPLING.

REFERENCES CITED

The following references are of record in the file of this patent:

UNITED STATES PATENTS

| Number | Name | Date |
| --- | --- | --- |
| 615,268 | Gillet | Dec. 6, 1898 |
| 1,421,558 | Preimesberger | July 4, 1922 |
| 2,038,038 | Gregg | Apr. 21, 1936 |
| 2,063,203 | Stanley | Dec. 8, 1936 |
| 2,079,753 | Tower | May 11, 1937 |
| 2,311,679 | Miller | Feb. 23, 1943 |

FOREIGN PATENTS

| Number | Country | Date |
| --- | --- | --- |
| 342,446 | Great Britain | Feb. 5, 1931 |